US012005016B2

(12) United States Patent
Noguchi et al.

(10) Patent No.: US 12,005,016 B2
(45) Date of Patent: Jun. 11, 2024

(54) ASSISTANCE APPARATUS

(71) Applicant: FUJI CORPORATION, Aichi-ken (JP)

(72) Inventors: Takehiro Noguchi, Chiryu (JP); Hideaki Nomura, Toyota (JP)

(73) Assignee: FUJI CORPORATION, Aichi-ken (JP)

( * ) Notice: Subject to any disclaimer, the term of this patent is extended or adjusted under 35 U.S.C. 154(b) by 633 days.

(21) Appl. No.: 17/281,978

(22) PCT Filed: Oct. 4, 2018

(86) PCT No.: PCT/JP2018/037141
§ 371 (c)(1),
(2) Date: Mar. 31, 2021

(87) PCT Pub. No.: WO2020/070848
PCT Pub. Date: Apr. 9, 2020

(65) Prior Publication Data

US 2021/0369524 A1 Dec. 2, 2021

(51) Int. Cl.
*A61G 7/10* (2006.01)
*A61G 5/14* (2006.01)

(52) U.S. Cl.
CPC ............. *A61G 7/1017* (2013.01); *A61G 5/14* (2013.01); *A61G 7/1046* (2013.01); *A61G 2200/34* (2013.01); *A61G 2200/36* (2013.01)

(58) Field of Classification Search
CPC .. A61G 7/1017; A61G 7/1056; A61G 7/1046; A61G 7/1096; A61G 7/1049;
(Continued)

(56) References Cited

U.S. PATENT DOCUMENTS

2012/0255118 A1* 10/2012 Hammond ........... A61G 7/1096 5/86.1

FOREIGN PATENT DOCUMENTS

CA 2230817 A1 * 10/1998 ........... A61G 7/1017
JP 2007244817 A * 9/2007 ............ A61G 5/045
(Continued)

OTHER PUBLICATIONS

JP-2007244817-A_english (Year: 2007).*
(Continued)

*Primary Examiner* — Justin C Mikowski
*Assistant Examiner* — Amanda L Bailey
(74) *Attorney, Agent, or Firm* — JCIPRNET

(57) ABSTRACT

An assistance apparatus (1) includes: a base (2); a support arm section (3) that can support a part of the body of the care receiver and that is provided to the base and can perform motion with respect to the standing direction for causing the care receiver to stand or the seating direction for causing the care receiver to be seated; an actuator (5) that is connected to the base and the support arm section; and a buffer mechanism (7) that is disposed at one of members from the base to the support arm section coupled via the actuator or is disposed between members connected to each other and that absorbs at least a part of a drive force of the actuator when an external force in the standing direction is applied by drive of the actuator to the support arm section performing motion toward the seating direction.

16 Claims, 5 Drawing Sheets

(58) Field of Classification Search
CPC .. A61G 7/1086; A61G 7/1092; A61G 7/1098; A61G 7/10; A61G 5/14; A61G 5/1078; A61G 2200/52; A61G 2200/36; A61G 2200/34
See application file for complete search history.

(56) References Cited

FOREIGN PATENT DOCUMENTS

| | | | | | |
|---|---|---|---|---|---|
| JP | 2008036392 | | * | 2/2008 | A61G 5/00 |
| JP | 2014230559 | A | * | 12/2014 | A61G 7/1019 |
| JP | 2016165313 | | | 9/2016 | |
| JP | 2017023299 | | | 2/2017 | |
| JP | 6111498 | B2 | * | 4/2017 | |
| KR | 20110038856 | | * | 4/2011 | A47K 11/04 |
| KR | 20170130971 | | * | 11/2017 | A61G 7/1049 |
| KR | 20180083126 | A | * | 7/2018 | A61G 7/1096 |
| WO | WO-2006025040 | A1 | * | 3/2006 | A61G 7/1007 |
| WO | WO-2010135681 | A2 | * | 11/2010 | A61G 5/14 |
| WO | WO-2013051492 | A1 | * | 4/2013 | A61G 7/1017 |
| WO | 2017134815 | | | 8/2017 | |
| WO | 2018168112 | | | 9/2018 | |

OTHER PUBLICATIONS

KR-20180083126-A_english (Year: 2018).*
JP 2014230559—english (Year: 2014).*
KR 2011-0038856—English (Year: 2011).*
JP-6111498-B2—English (Year: 2017).*
WO 2013/051492—English (Year: 2013).*
JP 2008036392—English (Year: 2008).*
KR 20170130971—English (Year: 2017).*
"International Search Report (Form PCT/ISA/210) of PCT/JP2018/037141," mailed on Nov. 20, 2018, with English translation thereof, pp. 1-2.

* cited by examiner

ASSISTANCE APPARATUS

CROSS-REFERENCE TO RELATED APPLICATION

This application is a 371 application of the International PCT application serial no. PCT/JP2018/037141, filed on Oct 4, 2018. The entirety of the above-mentioned patent application is hereby incorporated by reference herein and made a part of this specification.

TECHNICAL FIELD

The present specification relates to an assistance apparatus for assisting a transfer operation of a care receiver.

BACKGROUND ART

The need for assistance apparatuses has increased with the aging of society. An assistance apparatus generally moves a support section that supports a portion of a care receiver's body by the driving of an actuator. The introduction of assistance apparatuses reduces the physical burden on caregivers and care receivers and also alleviates the shortage of caregivers. As an example of an assistance apparatus, there is a apparatus for assisting the transfer operation of a care receiver from a sitting posture. An example of technology related to this type of assistance apparatus is disclosed in Patent Literature 1.

The human body transfer device of Patent Literature 1 includes a traveling section equipped with wheels, a human body support section positioned above the traveling portion for supporting the care receiver, and a driving section for driving the human body support section in the height direction. In addition, an extensible actuator and link mechanism corresponding to the driving portion are used in combination, and the extending operation of the extensible actuator is converted into an arc-shaped swinging operation of the support section. With this configuration, the caregiver can easily and quickly perform the transfer of the care receiver while the caregiver is prevented from injuring his/her lower back.

Patent Literature

Patent Literature 1: Japanese Patent Laid-Open No. 2016-165313

SUMMARY

Technical Problem

Not limited to the device disclosed in Patent Literature 1, when efforts are made to reduce size and weight as well as reduce costs needed for the assistance apparatus, there will be situations in which an unexpected physical load is imposed on the care receiver and comfortable use will be compromised. For example, when efforts are made to reduce size and weight as in Patent Literature 1, the gap between the human body support section and the traveling portion becomes small, and there is a risk of pinching the leg of the care receiver. In order to eliminate the risk, if the size of the assistance apparatus is increased to increase the gap, it will be impossible to satisfy the above-mentioned requirement. That is, there has been a trade-off between the size and weight reduction of the assistance apparatus and the comfort of the care receiver.

It is an object of the present specification to solve the problem of providing an assistance apparatus that is comfortable to use while reducing the size and weight of the apparatus.

Solution to Problem

The present specification discloses an assistance apparatus, comprising: a base on which the care receiver places his/her feet; a support arm section configured to support a part of the care receiver's body and operate in a stand-up direction for standing up the care receiver or a seating direction for seating the care receiver;

an actuator connected to the base and the support arm section and configured to drive the support arm section; and a buffer mechanism installed in at least one member among a plurality of members from the base to the support arm section connected via the actuator or installed between the members connected to each other from the base to the support arm section via the actuator and configured to absorb at least a part of a driving force of the actuator when an external force is applied in the stand-up direction to the support arm section driven in the seating direction by the actuator.

Advantageous Effect of the Invention

In the assistance apparatus disclosed herein, due to achieving a reduction in size and weight, there are cases in which an external force in the stand-up direction is applied from the care receiver to the support arm section which is operated in the seating direction. At this time, since the buffer mechanism absorbs at least a part of the driving force of the actuator, not all of the driving force comes from the support arm section to the care receiver. Therefore, an excessive physical burden is not generated on the care receiver, and comfortable use of the assistance apparatus is ensured.

DESCRIPTION OF THE EMBODIMENTS

1. Configuration of Assistance Apparatus 1 of the Embodiment

Figure 1:
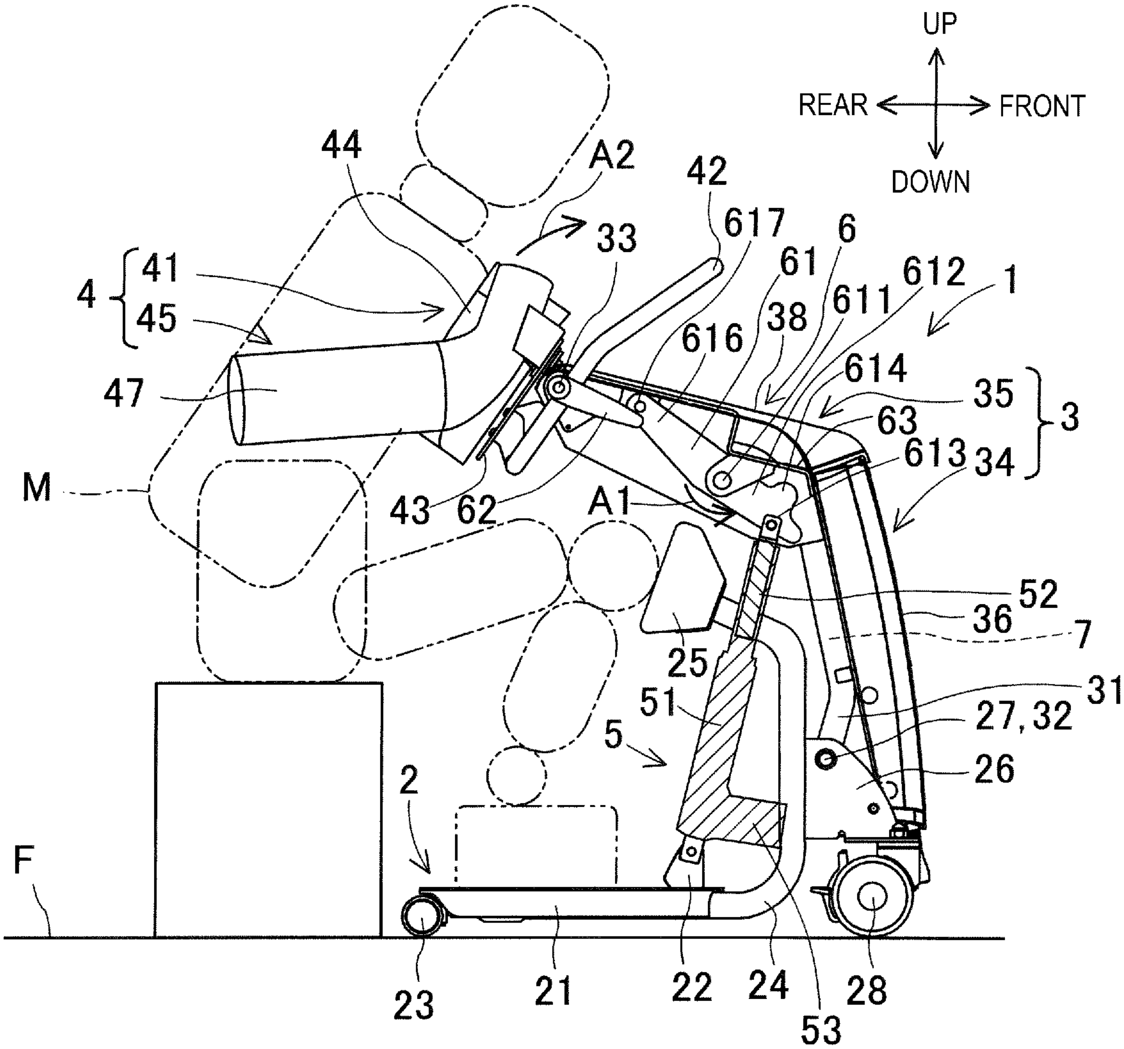
FIG. 1 A cross-sectional side view of the assistance apparatus of the embodiment showing the initial state in assisting the transfer operation of a care receiver.
Figure 2:
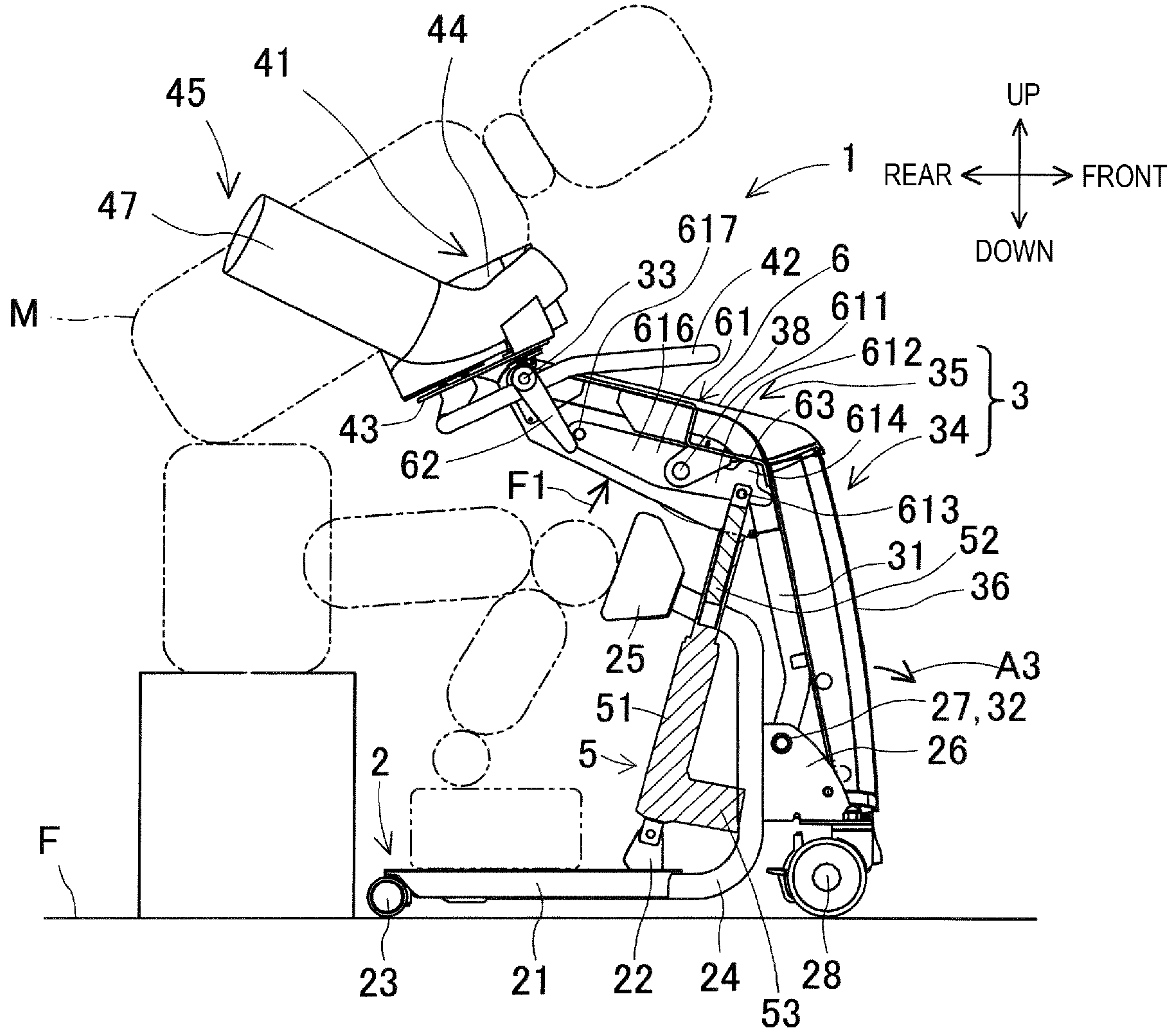
FIG. 2 A cross-sectional side view showing an intermediate state in assisting the transfer operation of the care receiver.
Figure 3:
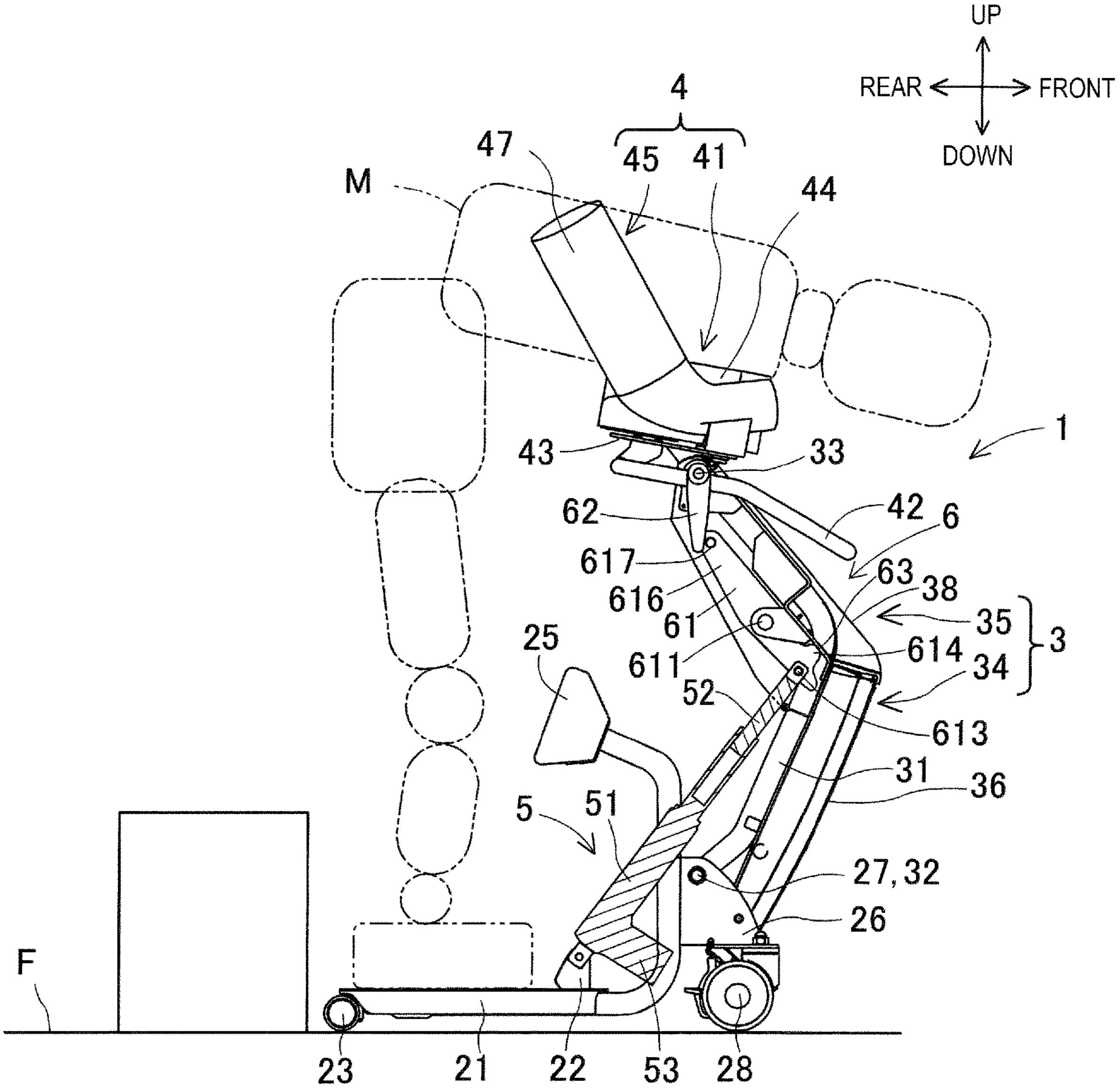
FIG. 3 A cross-sectional side view showing a final state in which the assistance apparatus assists the transfer operation of the care receiver.

Assistance apparatus 1 of the embodiment will be described with reference to FIGS. 1 to 5. FIGS. 1 to 3 are cross-sectional side views showing the progress of an operation in which assistance apparatus 1 assists care receiver M from a sitting posture to an in-transit posture. Assistance apparatus 1 of the embodiment is a apparatus in which efforts were made to reduce size and weight as well as reduce costs.

Assistance apparatus 1 assists the transfer of care receiver M between two different locations, for example, the transfer between a bed and a wheelchair, or the transfer between a wheelchair and a toilet seat. Assistance apparatus 1 supports the trunk of care receiver M and assists a transfer operation from a sitting posture to an in-transit posture and a seating operation from the in-transit posture to the sitting posture. Here, the in-transit posture is a posture in which the buttocks are separated from the seat surface and includes a standing posture and a stooping posture. That is, the in-transit posture includes a state in which the upper body is upright, a state in which the upper body is bent forward, and the like. Further, assistance apparatus 1 can transfer care receiver M in the in-transit posture in cases where the two locations between which transferring is to occur are separated from each other.

Assistance apparatus 1 includes base 2, arm 3, support section 4, actuator 5, link mechanism 6, buffer mechanism 7, control section (not shown), and the like. Base 2 is composed of footrest 21, rear wheels 23, base rods 24, lower leg contact 25, mounting plates 26, front wheels 28, and the like. Footrest 21 is positioned near floor surface F in a substantially horizontal manner. Footrest 21 is a portion on which care receiver M places his/her feet. Buffer mechanism 7 is disposed at the center in the right-left direction at the front of footrest 21. The pair of left and right rear wheels 23 are provided on the left and right at the rear of footrest 21.

The pair of left and right base rods 24 are provided so as to face forward from the left and right sides of the front face of footrest 21. Base rods 24 are bent upward from the front and then extended so as to be inclined backward. Lower leg contact 25 is provided on the upper portion of the two base rods 24, facing backward. Lower leg contact 25 is positioned above the front side of footrest 21. Lower leg contact 25 is made of a cushion material and designed to come in contact with the lower leg vicinity of care receiver M.

The pair of right and left mounting plates 26 are fixed at positions slightly upward along the bent portions which bend upward from the front of each base rod 24 and are each disposed facing each other. Mounting plate 26 extend forward from each base rod 24. Arm support fitting 27 is provided at the upper portion of each of the pair of left and right mounting plates 26. A pair of left and right front wheels 28 are provided on the underside at the front of the pair of left and right mounting plates 26. Steering functions of front wheels 28 and rear wheels 23 allow assistance apparatus 1 to not only move straight and turn but also move sideways and spin in place. Further, front wheels 28 have a locking function for restricting movement.

Arm 3 is formed from rod-shaped member 31, front cover 36, upper cover 38, various structural materials (not shown), and the like. Rod-shaped member 31 is a substantially U-shaped rod-shaped member having an open lower side. The lower ends 32 on both sides of rod-like member 31 are supported in a swingable manner by arm support fitting 27 of mounting plate 26. With this configuration, arm 3 swings in an operational direction which is the front-rear direction with respect to base 2. The forward swinging motion of arm 3 corresponds to the stand-up direction in which care receiver M is made to stand, and the rearward swinging motion corresponds to the seating direction in which care receiver M is seated.

In order to restrict the swing angle of arm 3, a stopper mechanism (not shown) is provided in the vicinity of arm support fitting 27. Rod-like member 31 extends upward from the left and right lower ends 32, and, along the way upward, bends and extends diagonally upward and rearward to come together in the upper portion toward the rear. The overall shape of arm 3 includes arm front portion 34, extending upward from arm support fitting 27, and arm upper portion 35, connected to arm front portion 34, extending obliquely upward toward the rear.

Front cover 36 constitutes arm front portion 34. Front cover 36 is disposed at a distance from the front of rod-like member 31. Both sides of front cover 36 are bent rearward to define the internal space of front cover 36. A battery (not shown) is accommodated in the internal space of front cover 36. The battery serves as a power source for actuator 5 and the control section.

Upper cover 38 is formed so as to be continuous with front cover 36 and constitutes arm upper portion 35. Upper cover 38 is disposed close to the upper side of rod-like member 31. Both sides of upper cover 38 are bent downward to define the internal space of upper cover 38. Link mechanism 6 is provided under the front of the internal space of upper cover 38. Further, support section attachment fitting 33 is provided in the rear upper side of the internal space.

Support section 4 has trunk support section 41 and a pair of right and left underarm support portions 45. Trunk support section 41 is supported in a swingable manner by support section attachment fitting 33 of arm upper portion 35. With this configuration, support section 4 swings in an operational direction which is the front-rear direction with respect to arm 3. The forward swing of support section 4 corresponds to the stand-up direction for standing up care receiver M, and the rear swing corresponds to the seating direction for seating care receiver M. Trunk support section 41 has handle 42. Handle 42 has a substantially rectangular frame shape. Handle 42 is a part grasped by care receiver M and is also a part grasped by the caregiver to move assistance apparatus 1.

Trunk support section 41 consists of base plate 43, trunk contact 44, and the like. Base plate 43 is formed in a substantially rectangular shape using a plate material made of metal or resin and having high rigidity. Base plate 43 is provided with handle 42, a part to be attached to support section mounting fitting 33, and second link member 62, which will be described later.

Trunk contact 44, made of a flexible material, is larger than base plate 43 and is attached to the upper face of base plate 43. Trunk contact 44 may have, for example, a two-layer structure including a surface layer and a base layer. Examples of a material for forming the surface layer include polyurethane foam having low resilience, and an example of a material for forming the base layer include polyurethane foam having low combustibility. Trunk support section 41 supports the area from the chest to the abdomen of the trunk which is a part of the body of care receiver M.

The pair of right and left underarm support portions 45 are attached to the right and left chest areas of trunk support section 41. Each underarm support portion 45 has an L-shape that bends at an obtuse angle. Underarm support portion 45 is formed from a core member and outer peripheral member 47. The core member is formed by bending a round bar or pipe made of metal or hard resin, for example.

Outer peripheral member 47 is formed with a cushion material in a cylindrical shape covering the outer periphery of the core member. The short straight portion from the proximal end of each underarm support portion 45, which is the attachment side, to the bending point becomes a shoulder receiving portion, and the long straight portion from the bending point to the distal end becomes a side entry portion. The shoulder receiving portion supports the front surface of the shoulder of care receiver M. The side entry portions enter both sides of the torso of care receiver M. Trunk support section 41 and underarm support portions 45 may be provided with a detachable cover made of cloth or leather.

Actuator 5 is an extensible actuator and includes main body portion 51, movable portion 52, motor 53, and the like. Main body portion 51 is a large-diameter cylindrical member that is long in the up-down direction and has an opening that opens in the upward direction. The lower end of main body portion 51 is connected to base 2 via buffer mechanism 7. Movable portion 52 is a small-diameter rod-shaped member that is long in the up-down direction. The upper end of movable portion 52 is connected to first link member 61 of link mechanism 6. The lower portion of movable portion 52 is fitted into the opening of main body portion 51.

Motor 53 is attached to the front of the lower portion of main body portion 51. Motor 53, with the direction of the current being controlled by the control section (not shown), drives extending operation and contracting operation of movable portion 52. Movable portion 52 extends and contracts with respect to main body portion 51 by the driving of motor 53. Instead of motor 53, actuator 5 may be a different type of driving source such as a pressure driving source using oil pressure or air pressure.

Actuator 5 performs a first extending operation that extends from a contracted length to a predetermined intermediate length, a second extending operation that extends from the intermediate length to an extended length, and a contracting operation that contracts from the extended length to the contracted length via the intermediate length. The stroke length of the first extending operation can be 30 mm and the stroke length of the second extending operation can be 60 mm.

Link mechanism 6 includes first link member 61, second link member 62, restricting member 63, and the like. First link member 61 is a member elongated in the front-rear direction having support point 611, forearm portion 612, and posterior arm portion 616. Support point 611 is disposed near the center of arm upper portion 35. Also, support point 611 is supported by the swing shaft of arm 3 in a swingable manner. As a result, first link member 61 swings about support point 611.

Forearm portion 612 extends forward from support point 611. Connecting pin 613 is provided at a lower portion of forearm portion 612 near the front. Connecting pin 613 connects forearm portion 612 with the upper end of movable portion 52 of actuator 5. Restricting protrusion 614 is formed on the top of forearm portion 612 toward the front.

Rear arm portion 616 extends rearward from support point 611. Engaging pin 617 is provided at the rear of rear arm portion 616 so as to extend in the left-right direction. As shown in FIGS. 1 to 3, engaging pin 617 engages with second link member 62 from the counterclockwise direction and pushes second link member 62 downward to swing second link member 62.

Second link member 62 is fixed to base plate 43 of support section 4 and extends forward. As a result, support section 4 and second link member 62 swing together about support section attachment fitting 33. Restricting member 63 is fixed to a structural member in front of arm upper portion 35. Restricting protrusion 614 of first link member 61 abuts against restricting member 63.

The control section (not shown) is composed of an operating device, a control main body, and the like. The operating device has an up button and a down button for operating actuator 5. The operating device is operated by the caregiver. The control main body is configured with a computer device having a CPU and is operated by software. The control main body controls the presence or absence of current flowing through motor 53 of actuator 5 and the direction of the current in accordance with the operation information of the up button and the down button.

2. Configuration of Buffer Mechanism 7

Figure 4:
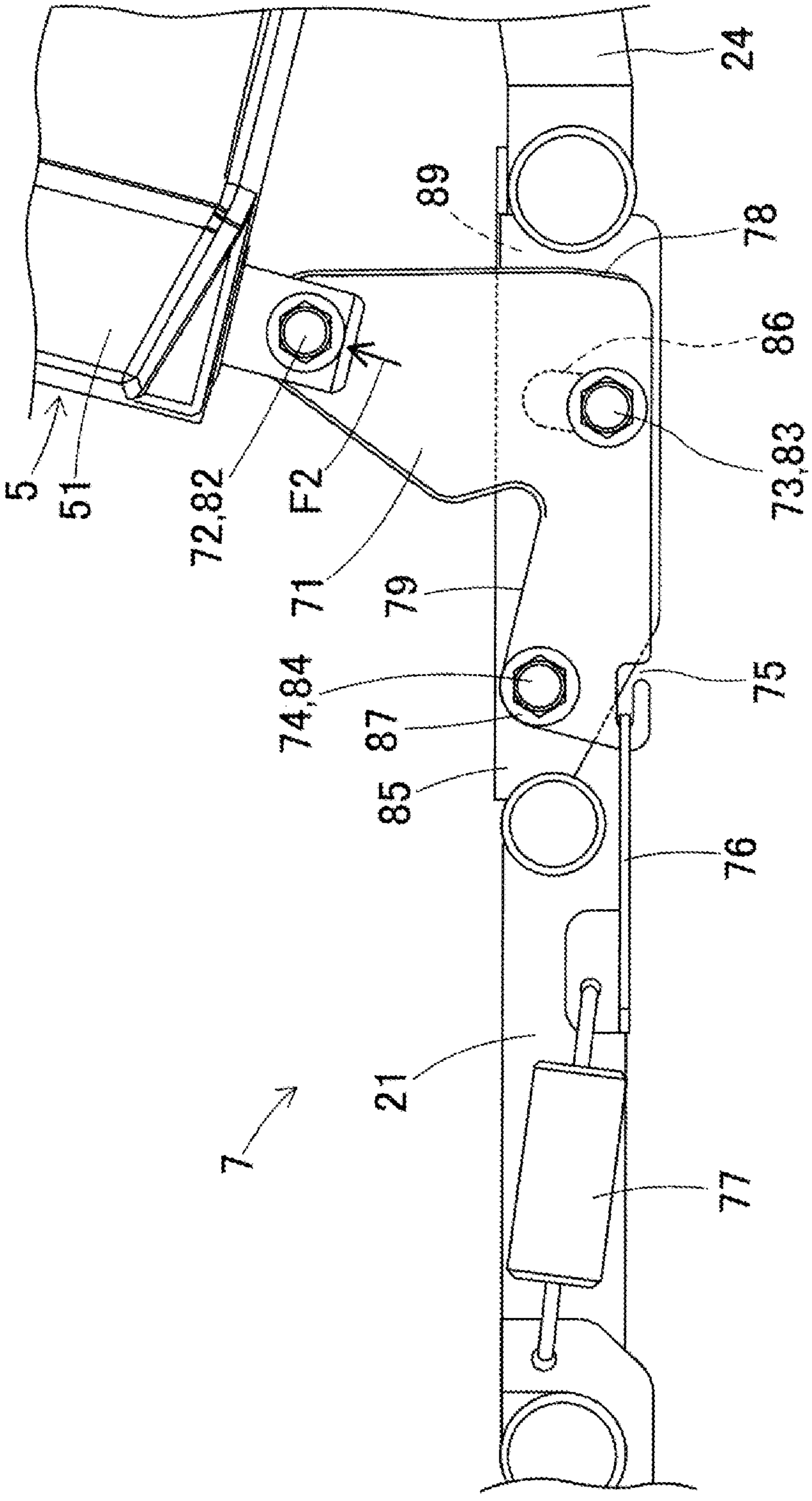
FIG. 4 A side view showing a configuration of a buffer mechanism.

Next, the configuration of buffer mechanism 7 will be described with reference to FIG. 4. FIG. 4 shows the original state before buffer mechanism 7 operates. Buffer mechanism 7 is connected to base 2 and actuator 5. In detail, notched hole 89 is provided at the center in the right-left direction toward the front of footrest 21 constituting base 2. Two support plates 85 are provided inside notched hole 89. Two support plates 85 are metal plate-shaped members elongated in the front-rear direction. Two support plates 85 are spaced in the right-left direction at a position below the upper surface of base 2 and are arranged in parallel. Elongated holes 86 are provided at the front of support plate 85 in an up-down direction. Rotation support fitting 87 is provided at the upper vicinity of the rear portion of support plate 85.

Buffer mechanism 7 includes bracket 71 and biasing member 77. Bracket 71 is installed between two support plates 85. Bracket 71 is a substantially L-shaped metal plate-shaped member having a front side that is high and a rear side that is low. Bracket 71 has fixed attachment portion 72 at the upper portion of the front side and displacement attachment portion 73 at the lower portion of the front side. Bracket 71 further has rotation fulcrum 74 at the upper portion of the rear side and biasing groove 75 at the lower portion of the rear side.

Fixed attachment portion 72 is attached, using connecting pin 82, to the lower end of main body portion 51 of actuator 5. Main body portion 51 is non-displaceable with respect to fixed attachment portion 72 and is rotatable around fixed attachment portion 72. Displacement attachment portion 73 is attached, using connecting pin 83, to elongated hole 86 of support plate 85. Connecting pin 83 is configured to move up and down in elongated hole 86. Therefore, displacement attachment portion 73 is capable of moving up and down with respect to elongated hole 86.

Rotation fulcrum 74 is provided spaced apart from displacement attachment portion 73. Rotation fulcrum 74 is attached, using support pin 84, to rotation support fitting 87 of support plate 85. Rotation fulcrum 74 is non-displaceable with respect to support plate 85 and can be rotated with respect to support plate 85. Biasing groove 75 opens to the lower edge of bracket 71 and extends rearward within bracket 71. The front end of intermediate member 76 is coupled to the inside of biasing groove 75. Intermediate member 76 is elongated in the front-rear direction and is a plate-shaped member bent in the width direction. The rear end of intermediate member 76 is coupled to the front end of biasing member 77.

Biasing member 77 is a coil-shaped spring and is not limited thereto. The front end of biasing member 77 is coupled to bracket 71 via intermediate member 76. The rear end of biasing member 77 is supported by footrest 21. Biasing member 77 is extendable and retractable in the front-rear direction and biases biasing groove 75 of bracket 71 rearward. Therefore, bracket 71 is biased counterclockwise in FIG. 4 about rotation fulcrum 74. Normally, bracket 71 is rotated counterclockwise, and connecting pin 83 is located at the lower end of elongated hole 86. As a result, the original state shown in FIG. 4 is maintained.

When upward force F2 from main body portion 51 of actuator 5 to bracket 71 acts, it is possible for bracket 71 to rotate clockwise. That is, bracket 71 rotates about rotation fulcrum 74 in a direction in which fixed attachment portion 72 rises, thus arriving at the operating state shown in FIG. 5. At this time, connecting pin 83 rises in elongated hole 86.

Incidentally, even in a configuration without biasing member 77, bracket 71 maintains the original state rotated counterclockwise by the action of gravity. However, in this configuration, when assistance apparatus 1 performs the assistance operation, there is a possibility that bracket 71 will unexpectedly rotate clockwise causing actuator 5 to rise. In other words, biasing member 77 has a function of stabilizing the assisting operation of assistance apparatus 1.

3. Assistance Operation of Assistance Apparatus 1 of the Embodiment

Next, the assistance operation of assistance apparatus 1 of the embodiment will be described. Hereinafter, the operation of assisting care receiver M from the sitting posture to the in-transit posture will be mainly described. The caregiver first returns actuator 5 to the contracted length of the initial state shown in FIG. 1. First link member 61 swings clockwise and second link member 62 swings counterclockwise. There is a gap between restricting protrusion 614 of first link member 61 and restricting member 63.

Subsequently, the caregiver grasps handle 42 and moves assistance apparatus 1 close to care receiver M in the sitting posture. Care receiver M enters his/her lower body into the space below support section 4 and places both feet on footrest 21. Care receiver M can obtain a stable posture by allowing a portion of the lower legs to come in contact with lower leg contact 25. Here, it is possible for second link member 62 to swing clockwise away from engaging pin 617 of first link member 61. That is, support section 4 freely swings forward. Therefore, it is possible to increase the size of the space below support section 4, and care receiver M can easily enter with his/her lower body without feeling cramped.

Subsequently, care receiver M tilts his/her trunk forward to bring his/her trunk in surface contact with trunk support section 41 and rests both of his/her sides on underarm support portions 45. When this occurs, since trunk support section 41 is tilted upright (the counterclockwise direction in FIG. 1), the forward inclination angle of the body can be small. In addition, since underarm support portions 45 are substantially horizontal or slightly lowered rearward, care receiver M can easily rest on underarm support portions 45. At this time, care receiver M is in the initial posture. The series of operations of care receiver M described above may be assisted by the caregiver. In the initial posture, the buttocks of care receiver M are seated on the seating surface. Therefore, care receiver M is in a comfortable posture because the weight-induced load is supported by the buttocks.

Subsequently, the caregiver presses the up button of the operating device to proceed with the assistance operation. Actuator 5 which has started the first extending operation, pushes forearm portion 612 of first link member 61 upward via connecting pin 613. Thus, first link member 61 is swung counterclockwise (see arrow A1 in FIG. 1). By the counterclockwise swing of first link member 61, engaging pin 617 pushes and swings second link member 62.

Second link member 62 swings in the clockwise direction, and support section 4 swings in the forward direction (stand-up direction) (see arrow A2 in FIG. 1). This operation continues until actuator 5 extends to a predetermined intermediate length, leading to the state shown in FIG. 2. At this time, since underarm support portions 45 are lowered in the forward direction, care receiver M is restricted from moving rearward and does not fall off from support section 4. In the state shown in FIG. 2, restricting protrusion 614 comes in contact with restricting member 63, and the swinging of first link member 61 is completed. Thus, the swinging of support section 4 is also completed. The buttocks of care receiver M are then momentarily separated from the seat surface.

Further, when actuator 5 starts the second extending operation, first link member 61 is pressed against arm 3 without swinging. Arm 3 is driven by actuator 5 and swings forward clockwise (stand-up direction) (see arrow A3 in FIG. 2). At the same time, actuator 5 tilts forward. In addition, support section 4 maintains a constant orientation with respect to arm 3. This operation continues until the final state of FIG. 3. This causes care receiver M to tilt further forward while moving his/her upper body obliquely upward and forward. Care receiver M assumes the in-transit posture in which the buttocks are greatly elevated from the seat surface and the legs are extended.

4. Operation and Action of Buffer Mechanism 7

Next, the operation and action of buffer mechanism 7 will be described. When assisting care receiver M in the reverse direction of the assistance operation of assistance apparatus 1, that is, when assisting care receiver M from the in-transit posture to the sitting posture, assistance apparatus 1 generally shifts from the state of FIG. 3 to the state of FIG. 1 via the state of FIG. 2. In this assistance operation, actuator 5 performs contracting operation and first swings arm 3 rearward (in the seating direction), and then swings support section 4 rearward (in the seating direction).

Here, due to achieving a reduction in size and weight of assistance apparatus 1, there are cases in which external force F1 in the stand-up direction is applied from care receiver M to arm 3 operating in the seating direction (see FIG. 2). For example, when care receiver M wears shoes with thick soles, the knees of care receiver M come in contact with arm 3, causing an external force F1 to be generated. Also, depending on the position and angle of legs of a large care receiver M, the knees and thighs come in contact with arm 3, causing an external force F1 to be generated. In these cases, care receiver M receives a load from arm 3 moving in the seating direction, resulting in a reduction in comfortable usage.

Figure 5:
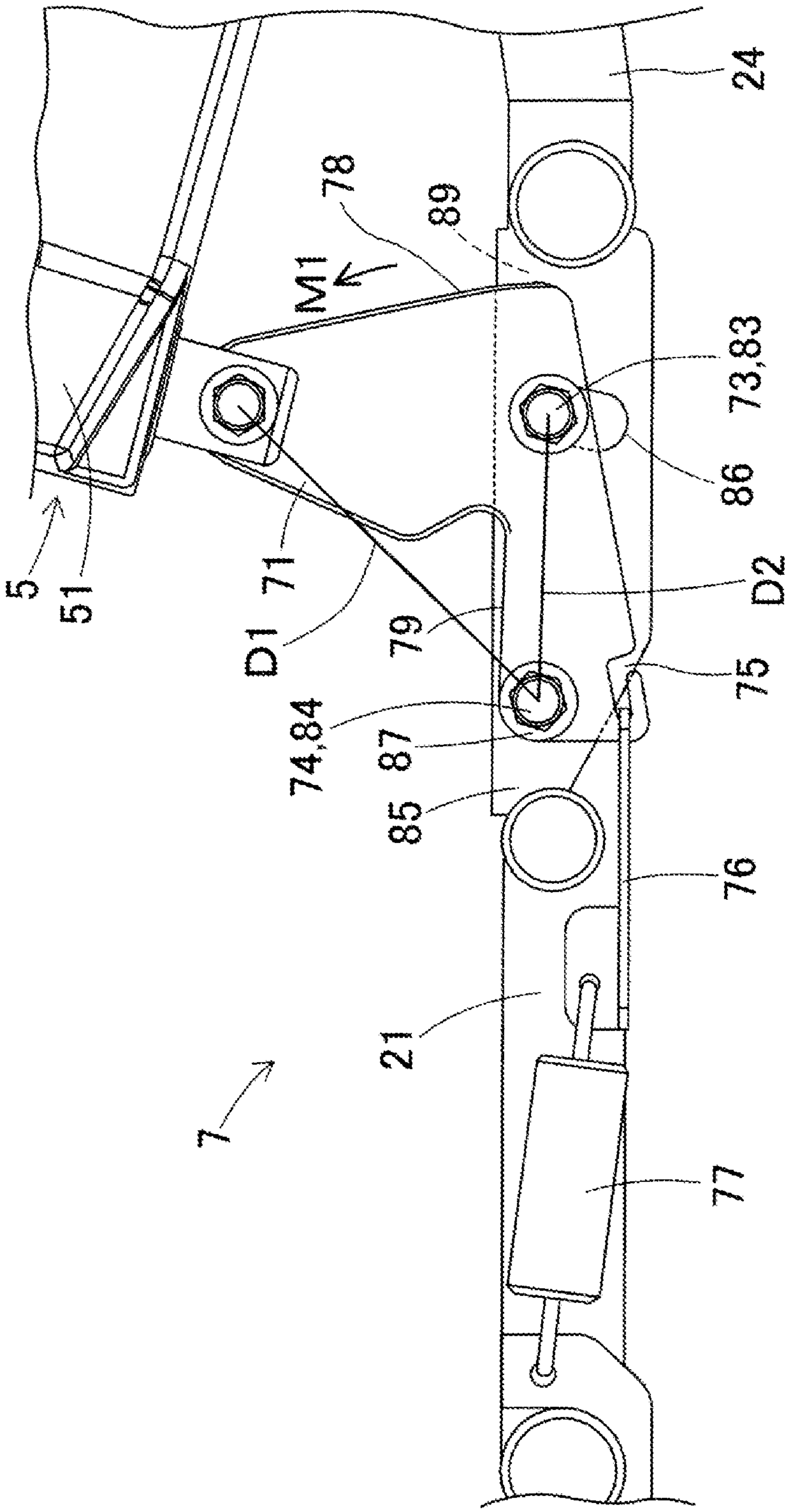
FIG. 5 A side view showing an operating state of the buffer mechanism.

Buffer mechanism 7 is provided to counter this possibility. Buffer mechanism 7 does not operate at every assistance operation of assistance apparatus 1 but operates only when external force F1 in the stand-up direction is applied to arm 3. FIG. 5 is a side view showing an operating state of buffer mechanism 7. External force F1 in the stand-up direction acts to drive arm 3 in the stand-up direction. On the other hand, a driving force due to the contracting operation of actuator 5 drives arm 3 in the seating direction against external force F1. If buffer mechanism 7 is not provided, the entire driving force of actuator 5 extends from arm 3 to care receiver M and an excessive physical burden may be placed on care receiver M.

In practice, buffer mechanism 7 absorbs the driving force of actuator 5 to maintain the current position of arm 3. In particular, when external force F1 is applied, the driving force due to the contracting operation of actuator 5 applies upward force F2 from main body portion 51 to bracket 71 (see FIG. 4). Due to force F2, bracket 71 rotates about rotation fulcrum 74 in a direction in which fixed attachment portion 72 rises (see arrow A5 in FIG. 5), arriving at the state shown in FIG. 5. As a result, the contraction allowance of actuator 5 and the lifted amount of fixed attachment portion 72 cancel each other, thereby causing the current position of arm 3 to be maintained. Accordingly, the driving force of actuator 5 is absorbed by buffer mechanism 7 and the physical burden on care receiver M is reduced.

Since rotation fulcrum 74 and displacement attachment portion 73 are separated from each other, bracket 71 can support actuator 5 in a stable manner. Also, the rotation operation of bracket 71 when fixed attachment portion 72 rises becomes smooth. In contrast, a modified configuration in which rotation fulcrum 74 of actuator 5 is replaced with a displacement attachment portion, thereby having two displacement attachment portions, is not impossible in principle. However, in this modified configuration, it is difficult to smoothly operate the displacement attachment portions at the two locations together when fixed attachment portion 72 rises.

Further, as shown in FIG. 5, first distance D1 between rotation fulcrum 74 and fixed attachment portion 72 is larger than second distance D2 between rotation fulcrum 74 and displacement attachment portion 73. Therefore, the distance fixed attachment portion 72 rises is larger than the longitudinal diameter in the up-down direction of elongated hole 86. Therefore, the effect of reducing the physical burden on care receiver M is extended further due to the increased range of the contraction allowance for actuator 5.

Further, peripheral portion 78 of the front side close to displacement attachment portion 73 of bracket 71 has an arc shape with rotation fulcrum 74 as the center. Thus, when bracket 71 rotates, the distance between peripheral portion 78 and the inner edge of notched hole 89 is kept constant. Therefore, there is no risk of the toes, socks, or the like of care receiver M getting caught. In addition, upper edge 79 and rotation fulcrum 74 of the rear of bracket 71 does not protrude from the upper surface of base 2 even when bracket 71 rotates. Consequently, there is no fear of giving a sense of discomfort to the soles of the feet of care receiver M or toes, socks, or the like getting caught as mentioned above.

Furthermore, when external force F1 still remains upon buffer mechanism 7 finishing the operation, first link member 61 of link mechanism 6 separates from restricting member 63 which first link member 61 has been pressed against. As a result, the driving force of actuator 5 is translated to the counterclockwise swing of first link member 61 and swinging in the seating direction of support section 4. As a result, the current position of arm 3 is maintained. That is, the physical burden on care receiver M is reduced in each of the two operations of buffer mechanism 7 and link mechanism 6.

In assistance apparatus 1 of the embodiment, due to achieving a reduction in size and weight, there are cases in which external force F1 in the stand-up direction is applied from care receiver M to arm 3 operating in the seating direction. At this time, since buffer mechanism 7 absorbs at least a part of the driving force of actuator 5, not all of the driving force comes from arm 3 to care receiver M. Therefore, an excessive physical burden is not generated on care receiver M, and comfortable use of assistance apparatus 1 is ensured.

5. Modifications and Applications of the Embodiment

The connecting position of buffer mechanism 7 is not limited to a position between base 2 and actuator 5. For example, buffer mechanism 7 may be connected between actuator 5 and link mechanism 6. Further, in a configuration in which link mechanism 6 is omitted, buffer mechanism 7 may be connected between actuator 5 and arm 3. Furthermore, buffer mechanism 7 may be provided between main body portion 51 and movable portion 52 of actuator 5. Buffer mechanism 7 may be configured to apply a spring having a shape that is normally compressed but extends during operation.

Furthermore, buffer mechanism 7 can also be provided in a configuration in which arm 3 and support section 4 of the embodiment are integrated into a support arm section in which the support arm section performs a lifting and lowering operation or a forward-rearward swinging operation. Actuator 5 is not limited to an extensible actuator and may be a rotary drive type actuator. Further, the configuration of link mechanism 6 can be appropriately modified. Further modifications and applications of the present embodiment are also possible.

What is claimed is:

1. An assistance apparatus configured to assist a transfer operation of a care receiver, comprising:

a base on which the care receiver places his/her feet;

a support arm section configured to support a part of the care receiver's body and operate in a stand-up direction for standing up the care receiver or a seating direction for seating the care receiver;

an actuator connected to the base and the support arm section and configured to drive the support arm section; and a buffer mechanism installed in at least one member among a plurality of members from the base to the support arm section connected via the actuator or installed between the members connected to each other from the base to the support arm section via the actuator and configured to absorb at least a part of a driving force of the actuator when an external force is applied in the stand-up direction to the support arm section driven in the seating direction by the actuator, wherein the buffer mechanism comprises a bracket with a fixed attachment portion attached to one of the members in a non-displaceable manner and a displacement attachment portion that is attached to the other one of the members in a displaceable manner, and wherein the bracket comprises:

the fixed attachment portion attached to the actuator which is the one of the the fixed attachment portion attached to the actuator which is the one of the members, the displacement attachment portion attached to the base which is the other one of the members, and a rotation fulcrum provided spaced apart from the displacement attachment portion and attached to the base in a non-displaceable but rotatable manner, and the bracket is rotatable around the rotation fulcrum in a direction in which the fixed attachment portion rises.

2. The assistance apparatus of claim 1, wherein the buffer mechanism comprises a biasing member configured to bias the bracket in a direction in which the fixed attachment portion descends.

3. The assistance apparatus of claim 1, wherein distance between the rotation fulcrum and the fixed attachment portion of the bracket is greater than distance between the rotation fulcrum and the displacement attachment portion.

4. The assistance apparatus of claim 1, wherein a peripheral portion of the bracket near the displacement attachment portion has a circular arc shape with the rotation fulcrum as a center.

5. The assistance apparatus of claim 1, wherein the support arm section comprises an arm provided in a swingable manner on the base in a front-rear direction and a support section configured to support a part of the body of the care receiver and provided in a swingable manner on the arm in the front-rear direction;

the actuator is an extensible actuator configured to perform a first extending operation for extending from a contracted length to a predetermined intermediate length, a second extending operation for extending from the intermediate length to an extended length, and a contracting operation for contracting from the extended length through the intermediate length to the contracted length;

the assistance apparatus further comprises a link mechanism comprising a first link member, provided on the arm in a swingable manner and configured to swing in accordance with the first extending operation of the extensible actuator and configured to be pressed against the arm but not swing in accordance with the second extending operation of the extensible actuator, and a second link member, fixed to the support section and pushed by the first link member; and, when an external force is applied in the stand-up direction on the arm operating in the seating direction by the contracting operation of the extensible actuator, the buffer mechanism operates, and then the first link member of the link mechanism separates from the arm.

6. An assistance apparatus configured to assist a transfer operation of a care receiver, comprising:

a base on which the care receiver places his/her feet;

a support arm section configured to support a part of the care receiver's body and operate in a stand-up direction for standing up the care receiver or a seating direction for seating the care receiver;

an actuator connected to the base and the support arm section and configured to drive the support arm section; and a buffer mechanism installed in at least one member among a plurality of members from the base to the support arm section connected via the actuator or installed between the members connected to each other from the base to the support arm section via the actuator and configured to absorb at least a part of a driving force of the actuator when an external force is applied in the stand-up direction to the support arm section driven in the seating direction by the actuator, wherein the buffer mechanism absorbs the driving force of the actuator to maintain a position of the support arm section, and wherein the buffer mechanism comprises a bracket with a fixed attachment portion attached to one of the members in a non-displaceable manner and a displacement attachment portion that is attached to other one of the members in a displaceable manner, wherein the bracket comprises:

the firxted attachment portion attached to the actuator which is the one of the members, the displacement attachment portion attached to the base which is the other one of the members, and a rotation fulcrum provided spaced apart from the displacement attachment portion and attached to the based in a non-displaceable but rotatable manner; and the bracket is rotatable around the rotation fulcrum in a direction in which the fixed attachment portion rises.

7. The assistance apparatus of claim 6, wherein the buffer mechanism comprises a biasing member configured to bias the bracket in a direction in which the fixed attachment portion descends.

8. The assistance apparatus of claim 6, wherein distance between the rotation fulcrum and the fixed attachment portion of the bracket is greater than distance between the rotation fulcrum and the displacement attachment portion.

9. The assistance apparatus of claim 2, wherein distance between the rotation fulcrum and the fixed attachment portion of the bracket is greater than distance between the rotation fulcrum and the displacement attachment portion.

10. The assistance apparatus of claim 7, wherein distance between the rotation fulcrum and the fixed attachment portion of the bracket is greater than distance between the rotation fulcrum and the displacement attachment portion.

11. The assistance apparatus of claim 6, wherein a peripheral portion of the bracket near the displacement attachment portion has a circular arc shape with the rotation fulcrum as a center.

12. The assistance apparatus of claim 2, wherein a peripheral portion of the bracket near the displacement attachment portion has a circular arc shape with the rotation fulcrum as a center.

13. The assistance apparatus of claim 7, wherein a peripheral portion of the bracket near the displacement attachment portion has a circular arc shape with the rotation fulcrum as a center.

14. The assistance apparatus of claim 3, wherein a peripheral portion of the bracket near the displacement attachment portion has a circular arc shape with the rotation fulcrum as a center.

15. The assistance apparatus of claim 8, wherein a peripheral portion of the bracket near the displacement attachment portion has a circular arc shape with the rotation fulcrum as a center.

16. The assistance apparatus of claim 6, wherein the support arm section comprises an arm provided in a swingable manner on the base in a front-rear direction and a support section configured to support a part of the body of the care receiver and provided in a swingable manner on the arm in the front-rear direction;

the actuator is an extensible actuator configured to perform a first extending operation for extending from a contracted length to a predetermined intermediate length, a second extending operation for extending from the intermediate length to an extended length, and a contracting operation for contracting from the extended length through the intermediate length to the contracted length;

the assistance apparatus further comprises a link mechanism comprising a first link member, provided on the arm in a swingable manner and configured to swing in accordance with the first extending operation of the extensible actuator and configured to be pressed against the arm but not swing in accordance with the second extending operation of the extensible actuator, and a second link member, fixed to the support section and pushed by the first link member; and, when an external force is applied in the stand-up direction on the arm operating in the seating direction by the contracting operation of the extensible actuator, the buffer mechanism operates, and then the first link member of the link mechanism separates from the arm.

* * * * *